(12) United States Patent
Kim et al.

(10) Patent No.: US 8,204,130 B2
(45) Date of Patent: Jun. 19, 2012

(54) VIDEO ENCODING APPARATUS AND METHOD

(75) Inventors: Tae-hee Kim, Suwon-si (KR);
Yeong-kyeong Seong, Suwon-si (KR);
Hyun-ki Baik, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1349 days.

(21) Appl. No.: 11/836,391

(22) Filed: Aug. 9, 2007

(65) Prior Publication Data

US 2008/0192831 A1    Aug. 14, 2008

(30) Foreign Application Priority Data

Feb. 8, 2007  (KR) .................. 10-2007-0013368

(51) Int. Cl.
*H04N 7/12*  (2006.01)
(52) U.S. Cl. .......... 375/240.24; 375/240.26; 375/240.25
(58) Field of Classification Search .............. 375/240.24
See application file for complete search history.

(56) References Cited

U.S. PATENT DOCUMENTS

| | | | | |
|---|---|---|---|---|
| 2006/0222074 | A1* | 10/2006 | Zhang | 375/240.16 |
| 2006/0233260 | A1* | 10/2006 | Watanabe | 375/240.24 |
| 2010/0111183 | A1* | 5/2010 | Jeon et al. | 375/240.16 |
| 2011/0280314 | A1* | 11/2011 | Sankaran et al. | 375/240.25 |

FOREIGN PATENT DOCUMENTS

| | | |
|---|---|---|
| KR | 2000-67690 | 11/2000 |
| KR | 2005-66951 | 6/2005 |

OTHER PUBLICATIONS

Flexible Macroblock Ordering, Wikipedia, printed out in year 2011.*
H.264/MPEG-4 AVC, Wikipedia, printed out in year 2011.*
Transcoding, printed out in year 2011.*

* cited by examiner

*Primary Examiner* — David Y Jung
(74) *Attorney, Agent, or Firm* — NSIP Law

(57) ABSTRACT

A video encoding apparatus and method to distribute one or more macroblocks, classified into the same slice group, over an entire frame, according to the H.264 standard. The video encoding apparatus includes: a macroblock group setting module, which sets the number of macroblocks in a macroblock group; a bit count extraction module, which extracts a bit count from each of the macroblocks; a bit count arrangement module, which arranges the macroblocks according to the extracted bit counts; a slice group determination module, which respectively allocates a plurality of slice group identifiers to the macroblocks, with reference to the result of the arrangement performed by the bit count arrangement module, so that a plurality of pieces of address information of the macroblocks can correspond one-to-one with the slice group identifiers; a rearrangement module, which classifies the macroblocks into a plurality of slice groups, according to the slice group identifiers of the macroblocks, and rearranges the macroblocks in slices of the slice groups; and an encoding module which encodes the rearranged macroblocks.

18 Claims, 5 Drawing Sheets

| BIT COUNT | MACROBLOCK ADDRESS | SLICE GROUP IDENTIFIER |
|---|---|---|
| 284 | 48 | 0 |
| 247 | 39 | 1 |
| 237 | 37 | 2 |
| 180 | 61 | 3 |
| 133 | 50 | 4 |
| 131 | 38 | 5 |
| 109 | 15 | 6 |
| 101 | 60 | 7 |
| 81 | 71 | 0 |
| ... | ... | ... |
| 0 | 92 | 2 |

| BIT COUNT | MACROBLOCK ADDRESS | SLICE GROUP IDENTIFIER |
|---|---|---|
| 245 | 1 | 0 |
| 237 | 2 | 1 |
| 221 | 3 | 2 |
| 180 | 4 | 3 |
| 133 | 15 | 4 |
| 131 | 16 | 5 |
| 109 | 17 | 6 |
| 101 | 18 | 7 |

VIDEO ENCODING APPARATUS AND METHOD

CROSS-REFERENCE TO RELATED APPLICATION

This application claims the benefit of Korean Application No. 2007-13368, filed Feb. 8, 2007, in the Korean Intellectual Property Office, the disclosure of which is incorporated herein by reference.

BACKGROUND OF THE INVENTION

1. Field of the Invention

Aspects of the present invention relate to a method and an apparatus for encoding video, and more particularly to a method and an apparatus for dispersing macroblocks that are allocated to the same slice group throughout a frame in H.264.

2. Description of the Related Art

The demands of higher data rates and higher quality of service in mobile communication systems are growing rapidly. Factors, such as, limited transmit power, limited bandwidth, and multi-path fading continue to restrict the data rates handled by practical systems. In multimedia communications, particularly in error-prone environments, error resilience of the transmitted media is critical in providing the desired quality of service, because errors in even a single decoded value can lead to decoding artifacts propagating spatially and temporally. Various encoding measures have been used to minimize errors while maintaining a necessary data rate. However, all of these techniques suffer from problems with errors arriving at the decoder side.

H.264 is a new video compression standard that provides considerably higher compression rates than conventional methods and is also known as moving picture expert group (MPEG)-4 advanced video coding (AVC). H.264 provides a compression rate twice as high as a conventional MPEG-4 advanced simple profile (ASP) does, enhanced perceptual quality, and DVD-like high-quality video data, at a data rate of less than 1 Mbps. Because of these reasons, it is expected that H.264 provides perfect video data at 30 frames per second (fps), in the case of high-speed internet connections using wireless, satellite, or asymmetric digital subscriber line (ADSL) networks. Here, a macroblock is a unit used to compress video images in video codecs, such as, MPEG and H.264.

Most video compression standards such as MPEG or H.26x adopt compression methods based on motion estimation, motion compensation, and transform. In such motion-compensation-based coding methods, information on the motion vectors of each macroblock must be encoded, in order to be transmitted, and code efficiency may vary depending on how the motion vectors are encoded.

Generally, a process for coding images respectively includes processing digital image signals using a discrete cosine transform (DCT) technique, performing a variable length code (VLC) by quantizing variable coefficients, storing the images that are restored by de-quantizing and performing an inverse DCT on DCT coefficients in a memory, calculating a motion vector using the restored image stored in the memory and an image in the next frame, performing VLC on the motion vector, and transmitting the motion vector along with encoded video information as a bit stream. A method of decoding the images is executed by reversing the above process.

As described above, the method of coding images is executed by using spatial redundancy and/or temporal redundancy. In the case of video codecs based on the temporal redundancy, the temporal redundancy between a current frame and a previous frame may be efficiently removed, by using a motion vector of a macroblock. For example, a macroblock that is the most similar to the current frame macroblock is searched for in the previous (reference) frame. Namely, the redundancy between the frames is efficiently removed, and code efficiency is improved by searching for a macroblock that has the minimum square of the distance between the two vectors, as a similarity standard for the current and previous frames.

FIGS. 1A and 1B illustrate a conventional macroblock coding process and the distribution of macroblocks in a predetermined frame. First, macroblocks are encoded, in order to acquire bit count information thereon, and the bit counts are sorted in descending order. Then, slice group identifiers (IDs) in the range of 0-7 are allocated to the sorted macroblocks' addresses in a cycle. That is, if the last ID "7" has been allocated to a bit count, the first ID "0" is allocated to the next bit count. The next ID is allocated to the following bit count until the last ID "7" has been allocated.

As illustrated in FIG. 1A, the first column of the table contains the bit counts of the macroblocks in descending order, the second column contains the macroblocks' addresses, and the third column contains IDs of the slice groups allocated to the macroblocks. When the slice group IDs have been allocated to all macroblocks, the macroblocks are given a new order, according to the allocated slice groups and each slice group is encoded.

Referring to FIG. 1B, a plurality of macroblocks exist in a single frame. Here, the macroblocks of the same slice group may be distributed adjacent to one another (see "(a)"). In this case, if a specific slice group is not decoded due to channel errors, it is difficult to decode a specific macroblock even though an error concealment algorithm is applied.

Korean Unexamined Patent No. 2005-066951 (method for storing macroblock decoding information in image decoder) discloses that data of a decoding information storage region (with respect to a current macroblock (MB) that is a decoding object of an image decoder, according to the validity of a data value of a decoding information storage region, by a slice number and a macroblock position and upper storage region) is updated using decoding information of a left storage region in the decoding information storage region. Decoding information about the decoded current MB is stored in the left storage region, if the current MB is decoded by the image decoder. However, this does not disclose how the macroblocks of the same slice group IDs are distributed in a frame.

SUMMARY OF THE INVENTION

Aspects of the present invention provide a video encoding apparatus and method, which can distribute one or more macroblocks, classified into the same slice group, over an entire frame, according to the H.264 standard. However, the aspects of the present invention are not restricted to the one set forth herein. The above and other aspects of the present invention will become more apparent to one of skill in the art, to which the present invention pertains, by referencing a detailed description of the present invention given below.

According to an aspect of the present invention, there is provided a video encoding apparatus, including: a macroblock group setting module, which sets a macroblock group comprising at least one macroblock; a bit count extraction module, which extracts a bit count from each of the macroblocks; a bit count arrangement module, which arranges the extracted bit counts; a slice group determination module, which respectively allocates a plurality of slice group identifiers to the macroblocks, with reference to the result of the arrangement performed by the bit count arrangement module, so that a plurality of pieces of address information of the macroblocks can correspond one-to-one with the slice group identifiers; a rearrangement module, which classifies the macroblocks into a plurality of slice groups, according to the slice group identifiers of the macroblocks, and rearranges the macroblocks in units of the slice groups; and an encoding module, which encodes the rearranged macroblocks in units of the slice groups.

According to another aspect of the present invention, there is provided a video encoding method, including setting a macroblock group comprising at least one macroblock, extracting a bit count from each of the macroblocks, arranging the extracted bit counts, respectively allocating a plurality of slice group identifiers to the macroblocks, with reference to the result of the arrangement, so that a plurality of pieces of the address information of the macroblocks can correspond one-to-one with the slice group identifiers, classifying the macroblocks into a plurality of slice groups, according to the slice group identifiers of the macroblocks, rearranging the macroblocks in units of the slice groups, and encoding the rearranged macroblocks in the units of the slice groups.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figures 1A, 1B:
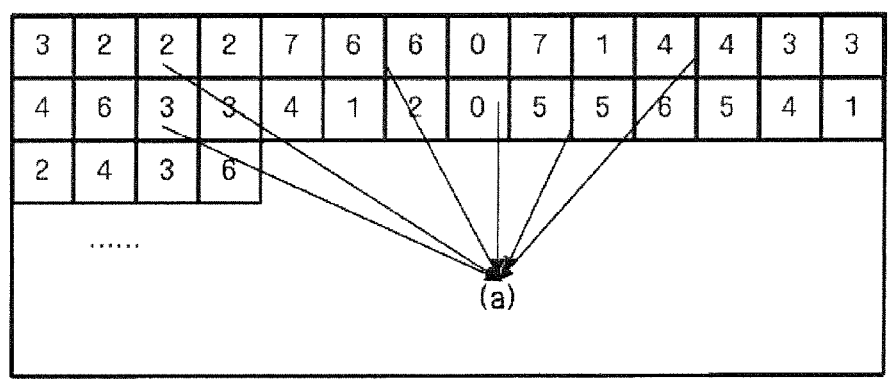
FIGS. 1A and 1B illustrate a conventional macroblock encoding method and the distribution of macroblocks in a frame.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
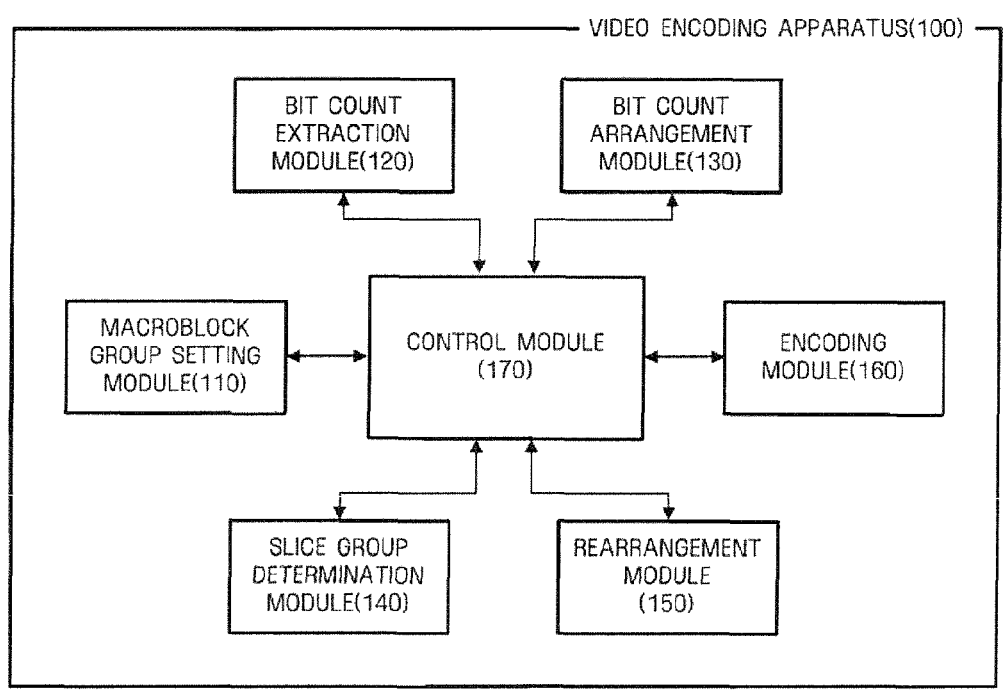
FIG. 2 is a block diagram of a video encoding apparatus according to an embodiment of the present invention.

FIG. 2 is a block diagram of a video encoding apparatus 100, according to an exemplary embodiment of the present invention. Referring to FIG. 2, the video encoding apparatus 100 includes a macroblock group setting module 110, a bit count extraction module 120, a bit count arrangement module 130, a slice group determination module 140, a rearrangement module 150, an encoding module 160, and a control module 170. While not required, the encoding apparatus 100 can be included in a portable apparatus which transmits video and/or images, such as, a camera, a portable media device, a cell phone, a portable computer, and/or non-portable devices. Such transmission can involve using wired and/or wireless protocols.

The macroblock group setting module 110 sets a macroblock group. A macroblock group includes at least one macroblock. The number of macroblocks in a macroblock group may be determined by the number of different slice group identifiers in a frame. That is, a macroblock group may include as many macroblocks as there are different slice group identifiers. While not required in all aspects, the number of slice group identifiers is predetermined prior to setting the macroblock groups. For example, if there are 8 different slice group identifiers, a size of the macroblock group may be determined to be 8 macroblocks. The macroblock group setting module 110 can assign the macroblocks to the macroblock groups. The macroblock group may be arranged, for example in a memory, so that the perimeter of the macroblock group can be minimized. For example the macroblocks of the macroblock group are disposed adjacent to one another.

The bit count extraction module 120 extracts bit count information relating to each macroblock. More specifically, the bit count extraction module 120 extracts a bit count of each macroblock in a macroblock group set by the macroblock group setting module 110. The bit count extraction module 120 may extract a bit count from a macroblock after the macroblock is encoded by the encoding module 160. The encoding of a macroblock by the encoding module 160 may be performed as follows: a residual signal is obtained by performing a differential operation on a predicted image obtained from the macroblock; a transform coefficient is generated by performing a spatial transform on the residual signal; and the transform coefficient is quantized. The encoding of a macroblock by the encoding module 160 will be described later, in further detail.

The bit count arrangement module 130 arranges the bit counts provided by the bit count extraction module 120. The bit counts can be arranged, for example, in descending order, ascending order, or in an order selected for a particular application. More specifically, the bit count arrangement module 130 may arrange the macroblocks, according to the bit counts extracted from the macroblock group defined by the macroblock group setting module 110, in a descending bit count order.

The slice group determination module 140 allocates slice group identifiers to the macroblocks that are arranged in a descending bit count order by arrangement module 130. Addresses of the macroblocks, for example memory addresses, can correspond one-to-one with the slice group identifiers. The macroblocks, in the arranged macroblock group, can each have different slice group identifiers.

The rearrangement module 150 classifies the macroblocks into slice groups, according to their slice group identifiers. For example, the rearrangement module 150 can classify macroblocks having a slice group identifier '0' into one slice group and can classify macroblocks having a slice group identifier '1' into another slice group. Macroblocks of different macroblock groups can be classified into the same slice group. The slice groups can comprise a number of units (slices). This classification operation may be performed for each slice identifier. Thereafter, the rearrangement module 150 rearranges the macroblocks in units (slices) of the slice groups.

The encoding module 160 encodes the macroblocks, rearranged by the rearrangement module 150, in units of the slice groups. The encoding module 160 may encode a macroblock that belongs to a predetermined slice group, as follows: the encoding module 160 generates a residual signal by performing a differential operation on a predicted image obtained from the macroblock, using a predetermined prediction method; a transform coefficient is generated by performing the spatial transform (such as, a discrete cosine transform (DCT), or a wavelet transform) on the residual signal; and a quantization coefficient is generated by performing a quantization on the transform coefficient. The quantization operation can be an operation by which a transform coefficient, which is represented by an arbitrary real number value, is split into one or more discrete values.

The control module 170 controls the operations of the macroblock group setting module 110, the bit count extraction module 120, the bit count arrangement module 130, the slice group determination module 140, the rearrangement module 150, and the encoding module 160.

The term 'module', as referred to herein, relates to but is not limited to, a software or hardware component, such as, a Field Programmable Gate Array (FPGA), or an Application Specific Integrated Circuit (ASIC) that performs certain tasks. A module may advantageously be configured to reside on the addressable storage medium and can be configured to be executed in one or more processors. A module may include, for example, components such as, software components, object-oriented software components, class components, and task components. A module can include processes, functions, attributes, procedures, subroutines, segments of program code, drivers, firmware, microcode, circuitry, data, databases, data structures, tables, arrays, and variables. The functionality provided for in the components and modules may be combined into fewer components and/or modules or further separated into additional components and/or modules.

Figures 3A, 3B:
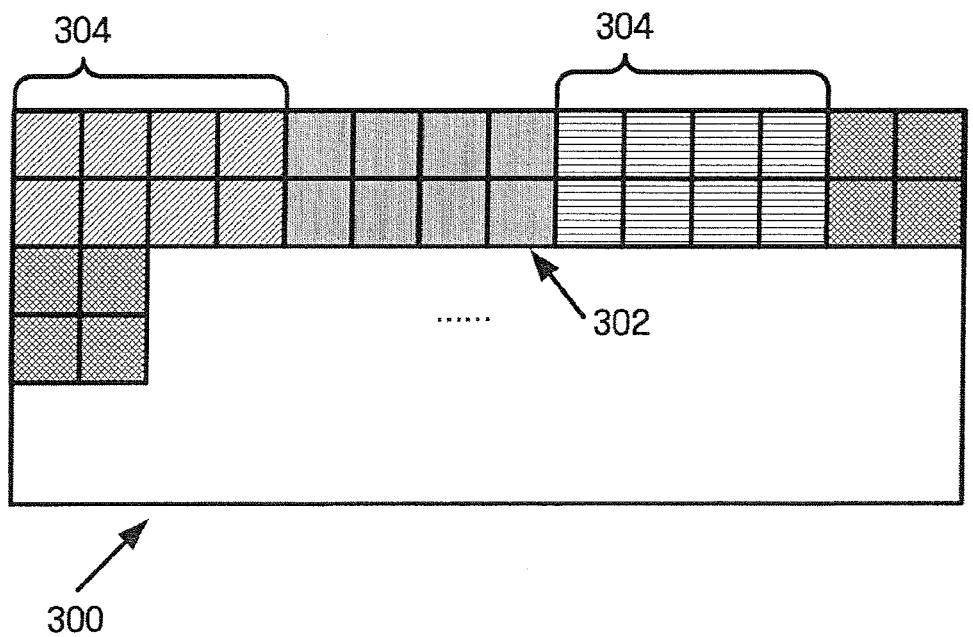
FIGS. 3A through 3C are diagrams for explaining the setting of a macroblock group by the video encoding apparatus illustrated in FIG. 2.
Figure 3C:
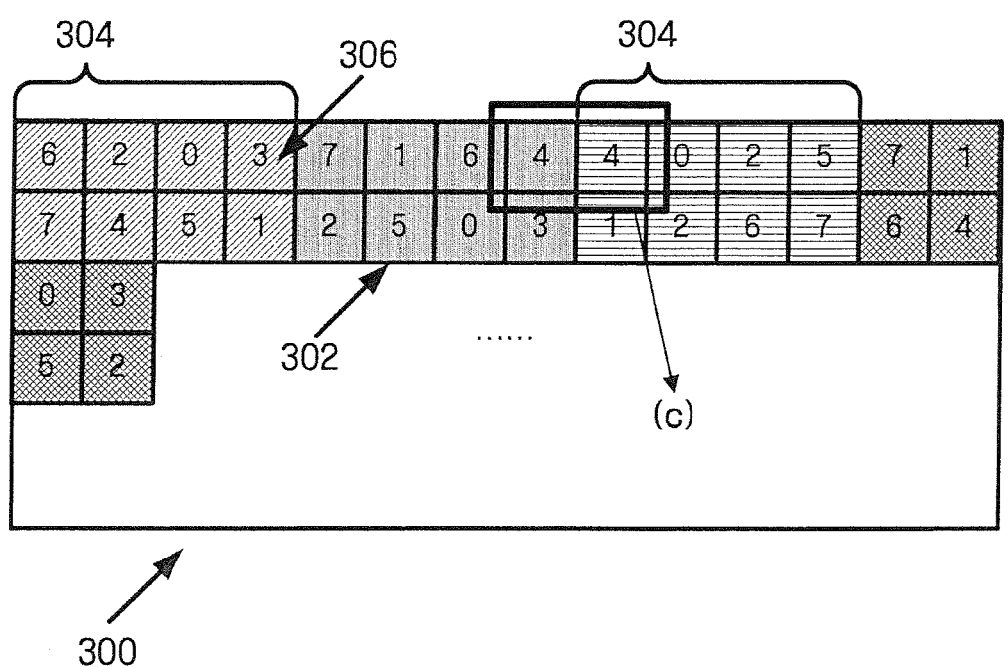

FIGS. 3A through 3C explain how the video encoding apparatus 100 illustrated in FIG. 2 sets a macroblock group, according to an exemplary embodiment of the present invention. Referring to FIG. 3A, a frame 300 includes a plurality of macroblocks 302. The macroblock group setting module 110 can assign the macroblocks 302 to macroblock groups 304. The macroblock group setting module 110 can determine the number of macroblocks 302 in the macroblock groups 304, based on the number of slice group identifiers 306 in the frame 300. For example, if there are eight slice group identifiers 306, the macroblock group setting module 110 may set the size of macroblock groups 304 to a value of 8 (i.e. 8 macroblocks 302 to a macroblock group 304).

The bit count extraction module 120 extracts a bit count from the macroblocks 302 present in each macroblock group 304. The bit count arrangement module 130 arranges the macroblocks 302 in a descending order, according to the extracted bit count of each macroblock 302. Thereafter, referring to FIG. 3B, the slice group determination module 140 allocates slice group identifiers 306 to the arranged macroblocks 302, so that addresses of the macroblocks 302 can have a one-to-one correspondence with the slice group identifiers 306. For example, each address of a macroblock 302 in a macroblock group 304 corresponds to a different slice group identifier 306.

Referring to FIG. 3C, the macroblocks 302 present in the macroblock group 304 have different slice group identifiers 306, which are depicted as numbers 0-7. In box (c), a pair of adjacent macroblocks 302, belonging to different macroblock groups 304, have the same slice group identifier 306 (i.e. 4), but this situation ordinarily occurs only rarely.

If each macroblock group 304 includes macroblocks 302 that have different slice group identifiers, it is possible to determine exactly which macroblock(s) 302 in a slice group contain an error, if an error is detected in a slice group.

Figure 4:
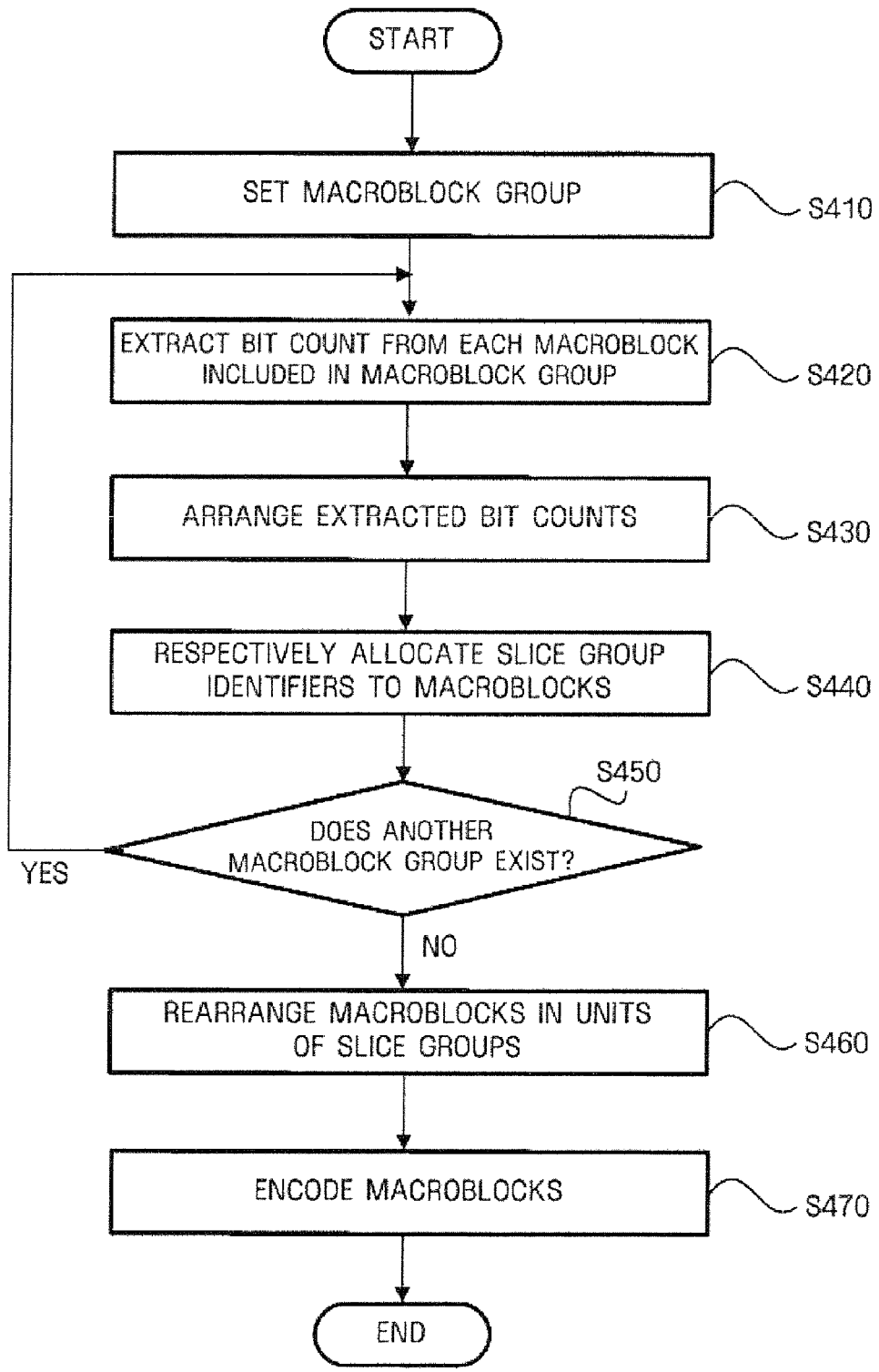
FIG. 4 is a flowchart illustrating a video encoding method according to an embodiment of the present invention.

FIG. 4 is a flowchart illustrating a video encoding method, according to an exemplary embodiment of the present invention. In this exemplary embodiment there are eight slice group identifiers, and the macroblock groups include 8 macroblocks.

In operation S410 the macroblock group setting module 110 sets the number of macroblocks in a macroblock group. For example, a macroblock group can include 8 macroblocks. The number of macroblocks in a macroblock group can be set according to the number of slice group identifiers in an image. The macroblock group may be arranged so that the circumference of the macroblock group can be minimized.

In operation S420, the encoding module 160 encodes the macroblocks in the macroblock group, and the bit count extraction module 120 extracts a bit count from each of the encoded macroblocks. The encoding of the macroblocks in the macroblock group has already been described above, with reference to FIG. 2.

In operation S430, the bit count arrangement module 130 arranges the macroblocks and/or extracted bit counts, according to a descending bit count order. The bit count arrangement module 130 allocates slice group identifiers to the arranged encoded macroblocks, so that the addresses of the encoded macroblocks, can correspond one-to-one with the slice group identifiers (S440). For example, none of the macroblocks in the macroblock group have the same slice group identifiers.

In operation S450, the control module 170 determines whether another macroblock group exists. If it is determined that another macroblock group exists, operations S420 through S440 are performed again.

On the other hand, if it is determined in operation S450 that no other macroblock group exists, the method proceeds to operation S460. In operation S460 the rearrangement module 150 classifies the encoded macroblocks into a plurality of slice groups, according to their slice group identifiers, and rearranges the encoded macroblocks in units of the slice groups.

In operation 470, the encoding module 160 encodes the macroblocks rearranged in slices of the slice groups.

According to aspects of the present invention, macroblock groups can be composed of macroblocks having different slice group identifiers. Since none of the macroblocks in each macroblock group have the same slice group identifiers, it is possible to determine exactly which of the macroblocks, in a slice group in which an error has occurred, is erroneous. Thus, it is possible to enhance the effect of an error concealment operation, when an error occurs.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A video encoding apparatus, comprising:
  a macroblock group setting module configured to set macroblock groups such that the macroblock groups comprise a predetermined number of macroblocks;
  a bit count extraction module configured to extract a bit count from each of the macroblocks in the set macroblock groups;
  a bit count arrangement module configured to arrange the macroblocks according to the extracted bit counts;
  a slice group determination module configured to respectively allocate a slice group identifier to each of the macroblocks in each macroblock group according to the arrangement performed by the bit count arrangement module such that address information of the macroblocks in each macroblock group corresponds one-to-one with the allocated slice group identifiers;
a rearrangement module configured to rearrange the macroblocks in each macroblock group such that no two adjacent macroblocks in the same macroblock group have the same slice group identifier; and
an encoding module configured to encode the rearranged macroblocks.

2. The video encoding apparatus of claim 1, wherein the macroblock group setting module is configured to set the size of the macroblock groups based on the number of different slice group identifiers to be allocated thereto.

3. The video encoding apparatus of claim 1, wherein the rearrangement module is configured to rearrange the macroblocks in each macroblock group such that none of the macroblocks in the same macroblock group have the same slice group identifier.

4. The video encoding apparatus of claim 1, wherein the encoding module is configured to encode the rearranged macroblocks using an H.264 encoding method.

5. A video encoding method, comprising:
setting macroblock groups such that each macroblock group comprises a predetermined number of macroblocks;
extracting a bit count from each of the macroblocks in the set macroblock groups;
arranging the macroblocks in the set macroblock groups according to the extracted bit counts;
allocating a slice group identifier to the macroblocks in each macroblock group according to the arrangement such that address information of the macroblocks in each macroblock group corresponds one-to-one with the allocated slice group identifiers;
rearranging the macroblocks in each macroblock group such that no two adjacent macroblocks in the same macroblock group have the same slice group identifier; and
encoding the rearranged macroblocks.

6. The video encoding method of claim 5, wherein the setting comprises setting a number of macroblocks in the macroblock groups based on the number of different slice group identifiers to be allocated.

7. The video encoding method of claim 5, wherein the macroblocks are rearranged such that none of the macroblocks in the same macroblock group have the same slice group identifier.

8. The video encoding method of claim 5, wherein the encoding comprises encoding the rearranged macroblocks using an H.264 encoding method.

9. The video encoding method of claim 5, wherein the macroblocks are assigned to the set macroblock groups.

10. The video encoding method of claim 5, further comprising determining whether another macroblock group exists and repeating the extracting, the arranging, and the allocating, if another macroblock group exists.

11. The video encoding method of claim 5, wherein the rearranging comprises arranging the macroblocks of a macroblock group in a memory such that the perimeter of the macroblock group is minimized.

12. The video encoding method of claim 5, wherein the extracting of the bit count further comprises encoding the macroblocks.

13. A video encoding apparatus, comprising:
a determiner configured to cyclically allocate a set of slice group identifiers to a plurality of macroblocks of a frame of video;
a rearranger configured to classify the plurality of macroblocks into one or more macroblock groups, and to rearrange the macroblocks in each macroblock group such that no two adjacent macroblocks in a respective macroblock group have the same slice group, identifier from the set of slice group identifiers;
an encoder configured to encode the rearranged macroblocks; and
a processor configured to execute one or more of the determiner, the rearranger, and the encoder.

14. The video encoding apparatus of claim 13, wherein the rearranger is configured to rearrange the macroblocks in the respective macroblock group such that none of the macroblocks in the respective macroblock group have the same slice group identifier.

15. The video encoding apparatus of claim 13, further comprising a setting module configured to set a size of the macroblock groups based on the number of slice group identifiers in the set of slice group identifiers.

16. A video encoding method, comprising:
cyclically allocating a set of slice group identifiers to a plurality of macroblocks of a frame of video;
classifying the plurality of macroblocks into one or more macroblock groups;
rearranging the macroblocks in each macroblock group such that no two adjacent macroblocks in a respective macroblock group have the same slice group identifier from the set of slice group identifiers; and
encoding the rearranged macroblocks,
wherein one or more of the cyclically allocating, the classifying, the rearranging, and the encoding is performed by a processor.

17. The video encoding method of claim 16, wherein the rearranging comprises rearranging the macroblocks in the respective macroblock group such that none of the macroblocks in the respective macroblock group have the same slice group identifier.

18. The video encoding method of claim 16, further comprising setting a size of the macroblock groups based on the number of slice group identifiers in the set of slice group identifiers.

* * * * *